(No Model.)  2 Sheets—Sheet 2.

H. B. COX.
ELECTRIC ACCUMULATOR SYSTEM.

No. 585,620.  Patented June 29, 1897.

Witnesses  Inventor

UNITED STATES PATENT OFFICE.

HARRY BARRINGER COX, OF HARTFORD, CONNECTICUT.

ELECTRIC ACCUMULATOR SYSTEM.

SPECIFICATION forming part of Letters Patent No. 585,620, dated June 29, 1897.

Application filed November 10, 1893. Renewed November 7, 1896. Serial No. 611,428. (No model.)

*To all whom it may concern:*

Be it known that I, HARRY BARRINGER COX, a citizen of the United States, residing at Hartford, in the county of Hartford and State of Connecticut, have invented certain new and useful Improvements in Electric Accumulator Systems; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to a system for charging accumulators.

It is well known to those skilled in the art that thermo-batteries as at present known can be made to produce a high volume of current but comparatively low voltage in a more compact form and with a higher fuel efficiency than can high-voltage machines be made.

It is generally the custom by any system to charge a number of accumulators by coupling them together in series and connecting them with the generator. This plan requires a generator of greater voltage than the combined voltage of the accumulators.

A further object of this invention is to provide an improved system for charging a plurality of accumulators from a generator of lower voltage than the voltage of the accumulator plant by successively placing one or more of the accumulator-cells in circuit with the generator for a predetermined period of time, so that the current from the generator is concentrated in an accumulator-cell or a relatively small group of the accumulator plant for a certain period of time, and so on, until the required accumulator plant is charged, although, perhaps, the voltage of the entire plant may be many times that of the generator employed.

The invention consists in the system and method hereinafter more fully described and particularly set forth.

Figure 1:
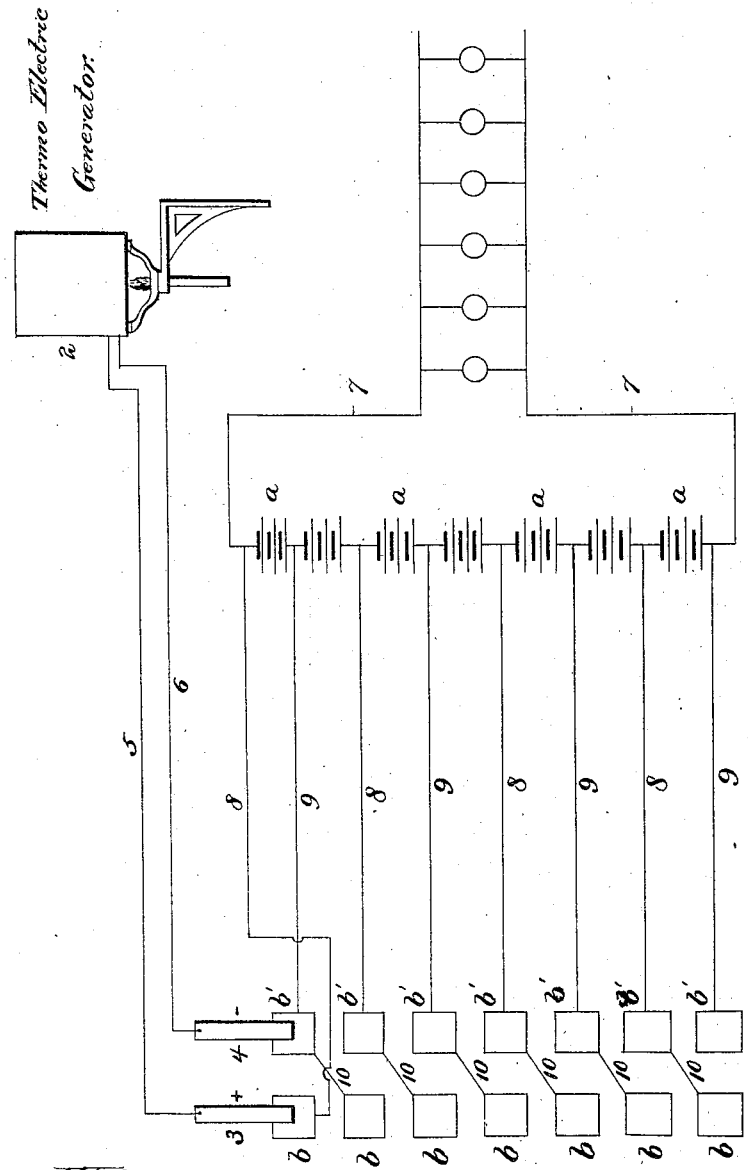
Figure 2:
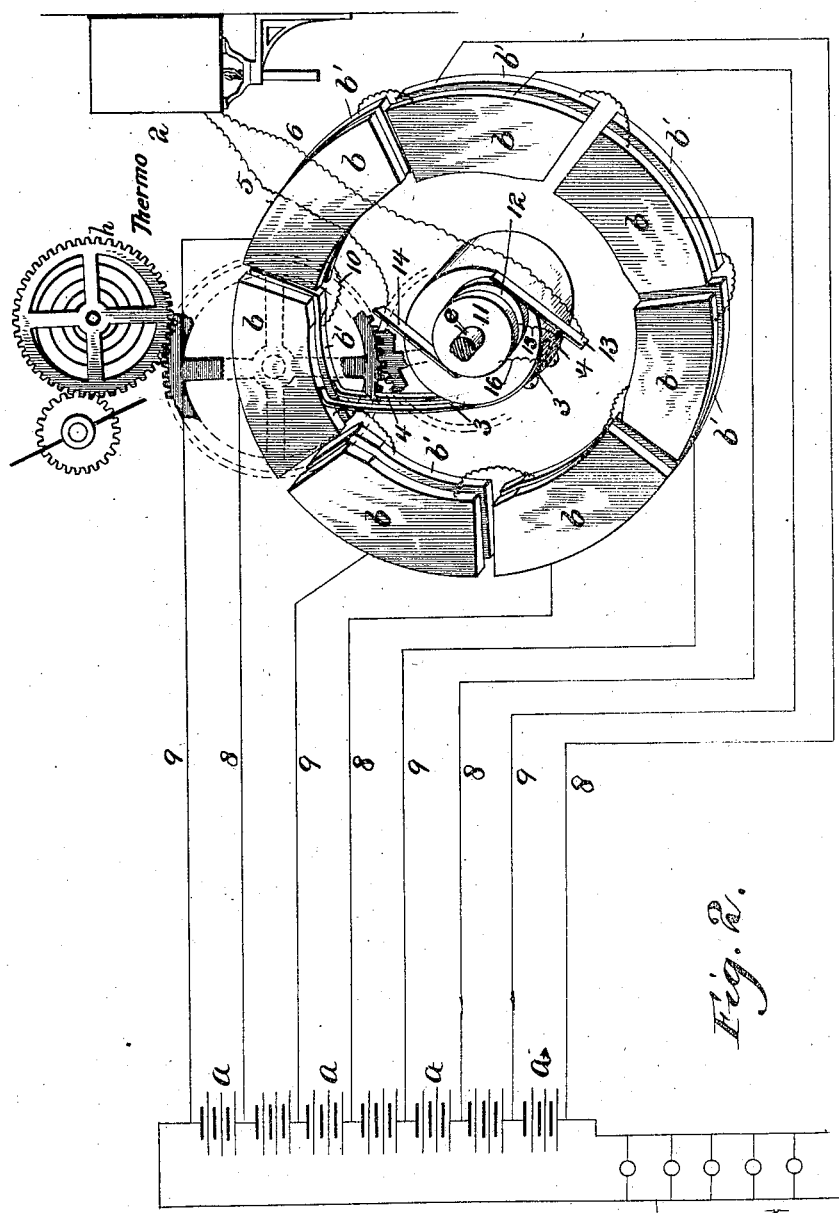

Referring to the accompanying drawings, Figure 1 illustrates, diagrammatically, the simplest form for carrying out my invention, illustrating the manner of connecting the parts. Fig. 2 shows, diagrammatically, the improved system with the time switch or distributer shown, diagrammatically, in perspective, the actuating means therefor being shown in plan.

Referring to the drawings, 2 indicates a thermo-electric generator which I preferably employ in carrying out my invention, although I do not wish to limit myself to such a generator of electric energy.

$a$ indicates a battery or plant of secondary, storage, or accumulator batteries or cells which are connected in series in the main or working circuit 7.

5 6 indicate, respectively, the connecting-wires of the system. The connections 5 and 6 are, respectively, electrically connected with the movable contacts 3 and 4.

A pair of stationary contact-points $b$ $b'$ are respectively electrically connected with the positive and negative poles of an accumulator-cell, and each accumulator-cell is provided with such a pair of contact-points.

In Fig. 1 the contact-plates $b$ $b'$ of each pair are arranged side by side, and the pairs of said plates are arranged in parallel rows, as shown, and the plates of each pair are respectively connected with the opposite poles of their accumulator by connections 8 and 9. In this view the positive plates are shown connected by wires 10 through the negative plate and wires 9 of the next adjacent pair, so that one wire 9 serves to connect to two accumulators. In this view each accumulator $a$ is intended to indicate a single accumulator-cell or a group of cells, or, in other words, such a number of cells as it is desired to place in circuit with the generator at one time. It will thus be seen that each pair of plates represent the terminals of an accumulator composed of one or more cells. The voltage of the generating plant may not be in itself sufficient for the lighting of one lamp, so that it is the object of this system to concentrate the current from the generator in each accumulator for a certain period of time, so that the combined voltage accumulated in all of the accumulators will be sufficient to light a number of lamps in the working circuit 7. To this end the contacts 3 and 4 turn into electrical engagement with the contacts $b$ $b'$, so that the current from the generator passes through wire 5, contacts 3 and $b$, connection 8, the accumulator, wire 9, connections $b'$ and 4, and wire 6 back to the generator. The movable contacts 3 and 4 remain on said stationary contacts b b' for a length of time sufficient to properly charge the accumulator connected with said points b b'. When this period of time expires, these contacts move from the first set of contacts b b' to the second set of contacts b b', thereby throwing the first accumulator out of circuit with the generator and placing the second accumulator in circuit with the generator.

The movable contacts remain on each pair of stationary contacts the same period of time, so that each accumulator is in circuit with the generator for the same period of time and all of the accumulators are charged equally.

In carrying out my invention for practical use any suitable mechanism is provided to automatically move the contacts 3 and 4 from one pair of accumulator-contacts to the next, and so on, permitting each accumulator to remain in circuit with the generator for a predetermined period of time.

I do not wish to limit myself to any particular construction of time-distributing or switch mechanism, and the mechanism herein described is merely intended to illustrate a form that can be employed, as clock mechanism or any source of power can be employed to move the contacts 3 and 4, or electromagnetic mechanism can be employed for the same purpose.

In Fig. 2 I show a mechanism for automatically distributing the electrical energy from the generator to each accumulator for a specified and predetermined period of time, or, in other words, what might be termed a "time-switch" mechanism is provided, which concentrates the energy of the generator on each one of the accumulators of the series successively and for a predetermined fixed period of time, so that all of the accumulators are charged equally. Referring to this mechanism specifically, the contacts b b' are arranged in two rings, one above the other, and said contacts are connected up and with the accumulators described in connection with Fig. 1 or in any other suitable manner to attain the result desired. A vertical shaft e is mounted centrally within these rings. This shaft is preferably formed of insulating material and carries the two contacts 3 and 4, in this instance formed as spring-brushes engaging the inner edges of their respective contacts b b', so that as said shaft revolves the said contacts will move along the inner edges of said stationary contact and will jump from one to the other. This shaft is provided with two metallic rings or disks 11 and 12, insulated from each other. The disk 12 is electrically connected by wire 15 with the contact or brush 4.

The ring 11 is electrically connected with the brush 3 by the wire 16.

The positive pole of the battery is connected by wire 5 with a brush 14, always in electrical engagement with the ring or disk 11. The opposite pole of the generator is connected by wire 6 with a brush 13, always in electrical engagement with the ring or disk 12. Thus as the shaft revolves the circuit is closed from the generator through the wire 5, brush 14, disk 11, wire 16, brush 3, and the particular metallic block b and the accumulator back through the particular corresponding metallic block b', brush 4, wire 15, disk 12, brush 13, and wire 6 to the generator.

A suitable clock mechanism, such as h, can be geared to the shaft to rotate the same, so that the brushes 3 and 4 remain in contact with each pair of blocks b b' a definite period of time, say forty minutes—that is, the brushes take forty minutes to pass the entire length of each pair of metallic blocks, thereby concentrating the energy of the generator on each accumulator for forty minutes.

The generator or source of electric energy 2 can be composed of one or more single generators. If several individual generators are employed, they can be coupled together to meet the requirements of the particular case—for instance, in series or multiple.

It is evident that various changes might be made in the forms, arrangements, and constructions of parts described without departing from the spirit and scope of my invention. Hence I do not wish to limit myself to the exact construction herein set forth, but consider myself entitled to all such changes as fall within the spirit and scope of my invention.

Having thus fully described my invention, what I claim, and desire to secure by Letters Patent, is—

1. In an electric accumulator system, the combination of two concentric rings of insulated contacts forming pairs of opposite contacts, sets of accumulators, direct electric connections between the contacts of one ring and said sets of accumulators, direct electric connections between each contact of a pair with the electrically-opposite contact of an adjoining pair, an insulated member concentrically within the rings and provided with two insulated brushes sliding in electrical engagement with the inner edges of the contacts of the two rings, respectively, a source of electrical energy of which said brushes form the opposite terminals, and driving means shifting the electrical contact between the brushes and each pair of contacts at regular intervals so that the current of the generator is concentrated on each set of accumulators in regular succession, substantially as described.

2. In an electric accumulator system, the combination of pairs of segmental-shaped separated blocks forming a ring, sets of accumulators, each pair of blocks connected to form the electrical terminals of a set of accumulators, a rotary insulated shaft arranged concentrically within the open center of the ring formed of the blocks, driving means for rotating said shaft in one direction, two insulated spring-brushes secured to and carried by the shaft with their outer ends sliding in electrical engagement with the inner edges of the corresponding blocks of each pair, respectively, and arranged to snap from block to block, and a source of electrical energy of which said brushes form the opposite terminals, substantially as described.

3. In an electric accumulator system, the combination of accumulators divided into like sets, a series of adjacent pairs of insulated electric contacts, direct electric connecting-wires from the opposite poles of each set of accumulators to the corresponding contacts of the adjacent pairs, cross connections from each of said corresponding contacts to the opposite contacts of the next succeeding pair so that each pair of contacts form the terminals of a set of accumulators and said corresponding contacts each form a terminal for two adjacent sets of accumulators, a source of electrical energy, a pair of contact-brushes forming the terminals of said source and arranged to successively engage each pair of contacts at predetermined intervals, and actuating means, substantially as described.

4. In an electric accumulator system, the combination of a series of sets of accumulators, a series of pairs of electric contacts corresponding to the sets of accumulators and each pair forming the opposite terminals of a set of accumulators, said pairs of contacts arranged in a circle or forming a ring with the curved separated inner edges arranged in two circles or rings, a rotary shaft concentrically within said ring, the two insulated brushes carried by and extending radially from said shaft with the free ends sliding around on the inner edges of said two circles of contact edges, respectively, a source of electrical energy, and connections therefrom to said brushes, respectively, and a motor coupled to said shaft so that the source is thrown into circuit with each set of accumulators for a like period, substantially as described.

5. In combination, a series of pairs of contact-blocks, the contacts of each pair insulated from each other and arranged beside and parallel with each other and having the concaved inner contact edges of approximately the same length, the pairs of contacts of the series separated from each other and forming two rings of blocks, the blocks electrically connected to form opposite terminals, a rotary member concentrically within the rings and provided with the pair of approximately parallel spring-brushes secured to and extending from the body with their free ends and sliding along said inner edges of the two rings of blocks, respectively, a source of electrical energy having connections to said brushes, and a motor coupled to said body to rotate the same, substantially as described.

In testimony that I claim the foregoing as my own I affix my signature in presence of two witnesses.

HARRY BARRINGER COX.

Witnesses:
O. E. DUFFY,
L. L. JOHNSON.